US008930367B2

(12) United States Patent (10) Patent No.: US 8,930,367 B2
Okuma et al. (45) Date of Patent: Jan. 6, 2015

(54) NON-TRANSITORY COMPUTER-READABLE MEDIUM, INFORMATION CLASSIFICATION METHOD, AND INFORMATION PROCESSING APPARATUS

(71) Applicant: Fuji Xerox Co., Ltd., Tokyo (JP)

(72) Inventors: Tomoko Okuma, Kanagawa (JP); Noriji Kato, Kanagawa (JP); Yasuhide Miura, Kanagawa (JP); Keigo Hattori, Kanagawa (JP); Motofumi Fukui, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 169 days.

(21) Appl. No.: 13/750,538

(22) Filed: Jan. 25, 2013

(65) Prior Publication Data

US 2014/0025682 A1 Jan. 23, 2014

(30) Foreign Application Priority Data

Jul. 17, 2012 (JP) .................................. 2012-158601

(51) Int. Cl.
*G06F 17/30* (2006.01)
(52) U.S. Cl.
CPC ...... *G06F 17/30253* (2013.01); *G06F 17/3071* (2013.01); *G06F 17/30247* (2013.01); *G06F 17/30707* (2013.01)
USPC .......................................... 707/737; 705/319
(58) Field of Classification Search
CPC ......... G06F 17/30; G06Q 50/01; H04L 51/32
USPC .......................................... 707/737; 705/319
See application file for complete search history.

(56) References Cited

U.S. PATENT DOCUMENTS

| 5,684,999 | A | 11/1997 | Okamoto | |
|---|---|---|---|---|
| 7,567,276 | B2* | 7/2009 | Anderson et al. | 348/231.2 |
| 7,751,592 | B1 | 7/2010 | Rosenberg et al. | |
| 7,930,647 | B2* | 4/2011 | Skrenta | 715/788 |
| 8,478,052 | B1* | 7/2013 | Yee et al. | 382/224 |
| 2009/0276500 | A1* | 11/2009 | Karmarkar | 709/206 |

(Continued)

FOREIGN PATENT DOCUMENTS

| JP | A-07-219969 | 8/1995 |
|---|---|---|
| JP | A-2009-193133 | 8/2009 |
| JP | A-2011-129009 | 6/2011 |
| JP | A-2012-079166 | 4/2012 |

OTHER PUBLICATIONS

Office Action issued in Australian Application No. 2013201018 issued Apr. 4, 2014.

*Primary Examiner* — Dennis Truong
(74) *Attorney, Agent, or Firm* — Oliff PLC

(57) ABSTRACT

There is provided a non-transitory computer-readable medium storing a program causing a computer to execute a process. The process includes: acquiring posted information items, each of the posted information items including at least either of a text information item and an image information item; generating text information items including text items in such a manner that image information items are removed from the posted information items, and classifying the text items into first categories; generating image information items including images in such a manner that text information items are removed from the posted information items, and classifying the images into second categories; associating the classified text items and the classified images with each other on the basis of the first and second categories to obtain results; and outputting the text items and the images for each of the results.

6 Claims, 12 Drawing Sheets

(56) References Cited

U.S. PATENT DOCUMENTS

| | | | |
|---|---|---|---|
| 2010/0303342 A1* | 12/2010 | Berg et al. | 382/155 |
| 2012/0084323 A1* | 4/2012 | Epshtein et al. | 707/776 |
| 2012/0109754 A1* | 5/2012 | Mei et al. | 705/14.64 |
| 2012/0117475 A1* | 5/2012 | Lee et al. | 715/733 |
| 2013/0124471 A1* | 5/2013 | Chen et al. | 707/624 |
| 2013/0159277 A1* | 6/2013 | Liu et al. | 707/709 |
| 2013/0198683 A1* | 8/2013 | Matas | 715/784 |
| 2013/0304836 A1* | 11/2013 | Ku et al. | 709/206 |
| 2014/0146053 A1* | 5/2014 | Cragun et al. | 345/467 |
| 2014/0164371 A1* | 6/2014 | Tesch et al. | 707/731 |

\* cited by examiner

FIG. 3

| MICROBLOG ID | CONTENT |
|---|---|
| 1 | I'm excited about the fireworks tonight! |
| 2 | I'm at a bus station now. |
| 3 | http://XXX.XXX.com/image1.jpg |
| 4 | The bus was densely crowded. I am so tired (>_<) |
| 5 | I've found a unique item! http://XXX.XXX.com/image2.jpg |
| 6 | It was so delicious b(^_^)b |
| 7 | http://XXX.XXX.com/*.jpg |
| 8 | The fireworks were so beautiful! |

FIG. 5
| MICROBLOG ID | IMAGE CONTENT |
|---|---|
| 3 | 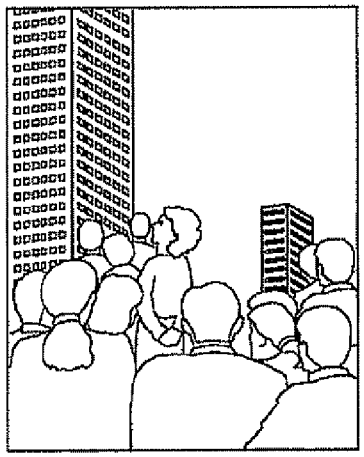 |
| 5 | 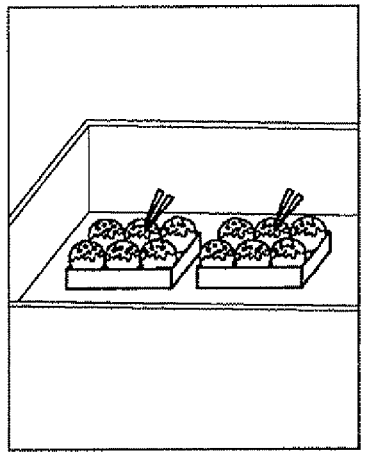 |
| 7 | 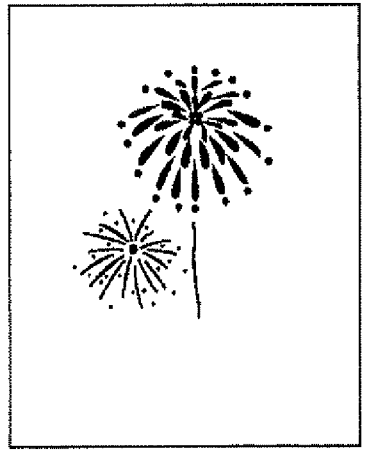 |

FIG. 6

| MICROBLOG ID | CONTENT | CATEGORY |
|---|---|---|
| 1 | I'm excited about the fireworks tonight! | FIREWORKS |
| 2 | I'm at a bus station now | NO CATEGORY |
| 4 | The bus was densely crowded. I am so tired (>_<) | CROWDED, VEHICLE |
| 5 | I've found a unique item! | NO CATEGORY |
| 6 | It was so delicious b(^_^)b | SHOP STAND |
| 8 | The fireworks were so beautiful! | FIREWORKS |

FIG. 7
| MICROBLOG ID | IMAGE CONTENT | CATEGORY |
|---|---|---|
| 3 | 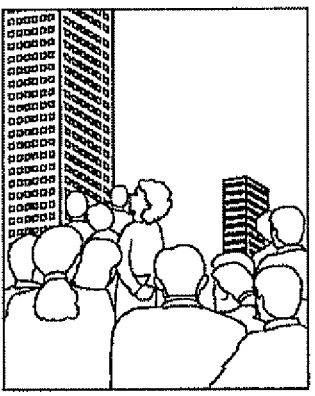 | CROWDED |
| 5 | 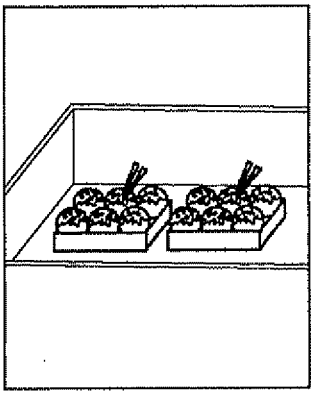 | SHOP STAND, FOOD |
| 7 | 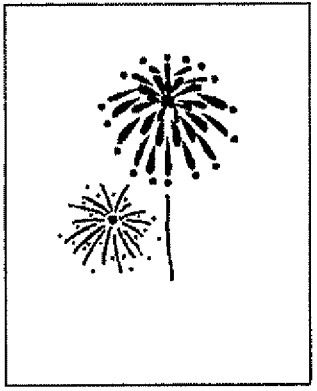 | FIREWORKS |

| MICROBLOG ID | IMAGE CONTENT | MICROBLOG ID | TEXT CONTENT | CATEGORY |
|---|---|---|---|---|
| 7 | | 1 | I'm excited about the fireworks tonight! | FIREWORKS |
|   |   | 8 | The fireworks were so beautiful! |   |
| 3 | | 4 | The bus was densely crowded. I am so tired (>_<) | CROWDED |
| 5 | | 6 | It was so delicious b(^_^)b | SHOP STAND |

FIG. 12

| OVERALL CATEGORY | TEXT INFORMATION CATEGORY | IMAGE INFORMATION CATEGORY |
|---|---|---|
| COLLEAGUES | FAMILY, FRIENDS, COUPLE | HUMAN |
| NEGATIVE | OBSTACLES, CROWDED, DISAPPOINTED | WAIT IN LINE |
| SHOP STAND | SHOP STAND | SHOP STAND, FRIED NOODLES, COTTON CANDY |
| ... | ... | ... |

US 8,930,367 B2

NON-TRANSITORY COMPUTER-READABLE MEDIUM, INFORMATION CLASSIFICATION METHOD, AND INFORMATION PROCESSING APPARATUS

CROSS-REFERENCE TO RELATED APPLICATIONS

This application is based on and claims priority under 35 USC 119 from Japanese Patent Application No. 2012-158601 filed Jul. 17, 2012.

BACKGROUND

Technical Field

The present invention relates to a non-transitory computer-readable medium, an information classification method, and an information processing apparatus.

SUMMARY

According to an aspect of the invention, there is provided a non-transitory computer-readable medium storing a program causing a computer to execute a process. The process includes the following: acquiring multiple posted information items, each of the multiple posted information items including at least either of a text information item and an image information item; generating text information items including multiple text items in such a manner that image information items are removed from the multiple posted information items, and individually classifying the text items included in the text information items into first categories; generating image information items including multiple images in such a manner that text information items are removed from the multiple posted information items, and individually classifying the images included in the image information items into second categories; associating the classified text items and the classified images with each other on the basis of the first and second categories to obtain results; and outputting the text items and the images, which have been associated with each other, for each of the results.

BRIEF DESCRIPTION OF THE DRAWINGS

Exemplary embodiments of the present invention will be described in detail based on the following figures, wherein:

FIG. 3 is a schematic diagram illustrating an example of a configuration of microblog information items;

FIG. 5 is a schematic diagram illustrating an example of a configuration of microblog image information items;

FIG. 6 is a schematic diagram illustrating an example of a configuration of microblog-text-information classification results;

FIG. 7 is a schematic diagram illustrating an example of a configuration of microblog-image-information classification results;

FIG. 12 is a schematic diagram illustrating an example of a configuration of category association information items.

DETAILED DESCRIPTION

First Exemplary Embodiment

Configuration of Microblog Classification System

Figure 1:
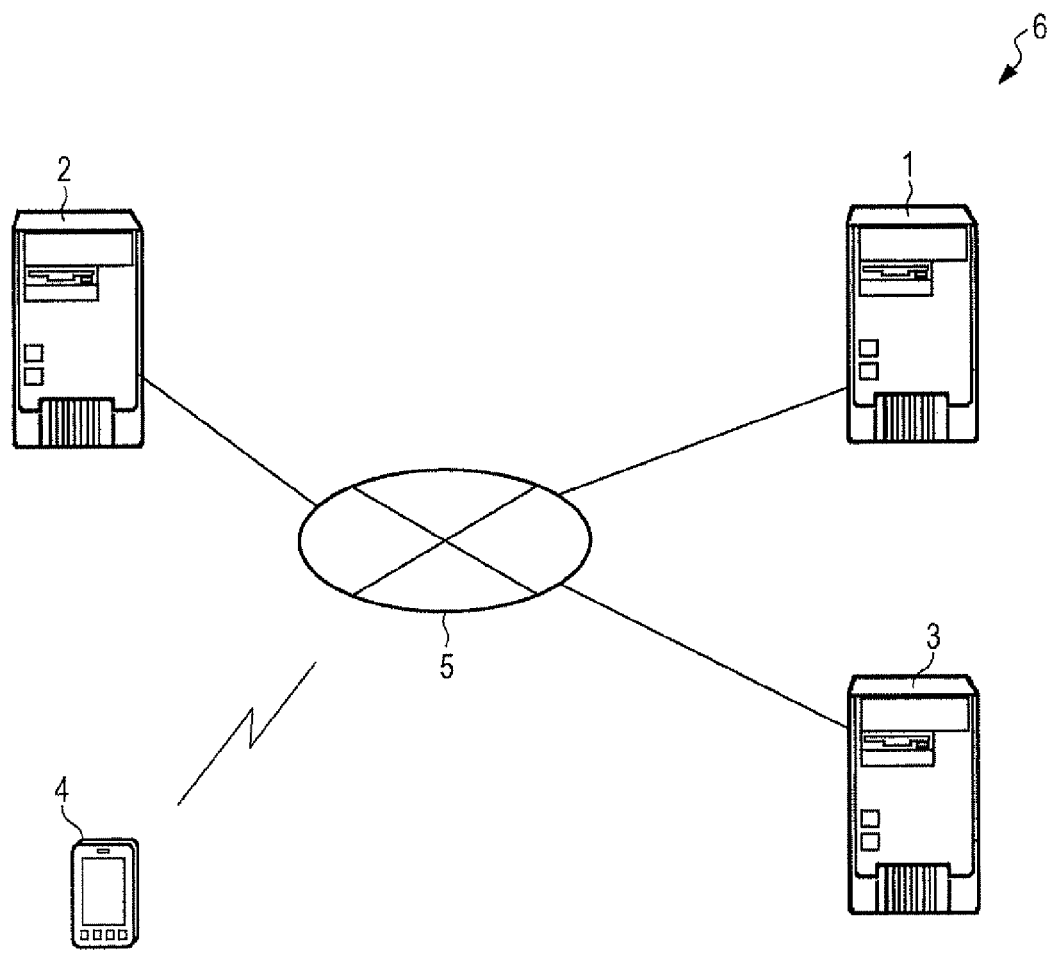
FIG. 1 is a block diagram illustrating an example of a configuration of a microblog classification system according to a first exemplary embodiment of the present invention.

FIG. 1 is a schematic diagram illustrating an example of a configuration of a microblog classification system according to a first exemplary embodiment of the present invention.

A microblog classification system 6 includes a microblog classification server 1, a microblog server 2, a web server 3, and a terminal 4, and connects, using a network 5, the individual apparatuses so that the apparatuses are able to communicate with each other. Here, a microblog is a medium in which multiple text information items and image information items that were posted (transmitted) are mixed and displayed in chronological order. More specifically, microblog information items stored in the microblog server 2 are subjected to a display process by an information processing apparatus such as the terminal 4, whereby the microblog is displayed. Hereinafter, the unit of an information item posted on the microblog is referred, for simplicity, to as a "posted information item". It is supposed that a posted information item includes a text information item and an image information item, includes only a text information item, or includes only an image information item. In other words, each of the microblog information items includes multiple posted information items.

The microblog classification server 1 is an information processing apparatus that includes electronic components such as a central processing unit (CPU) having functions for processing information items and a memory. The microblog classification server 1 acquires the microblog information items from the microblog server 2, and classifies multiple text information items and image information items that are included in posted information items into individual categories.

The microblog server 2 is an information processing apparatus that includes electronic components such as a CPU having functions for processing information items and a memory. The microblog server 2 accepts text information items such text items and/or image information items concerning still images such as photographs or moving images, which have been transmitted from the terminal 4 or the like and which are to be referred to as posted information items, and generates microblog information items for displaying the posted information items in chronological order. Moreover, when the microblog server 2 accepts, from the terminal 4, a request to view the microblog information items, the microblog server 2 transmits the microblog information items to the terminal 4. Note that it is supposed that an image information item included in a posted information item directly includes an information item concerning a still image or a moving image or includes a link destination information item concerning a link destination in which an information item concerning a still image or a moving image is stored. Furthermore, a text information item included in a posted information item may directly include an information item concerning a text item or may include a link destination information item concerning a link destination in which an information item concerning a text file, a hypertext markup language (HTML) file, or the like is stored.

The web server 3 is an information processing apparatus that includes electronic components such as a CPU having functions for processing information items and a memory. The web server 3 stores, in the memory, webpage information items for displaying webpages such as HTML files. When the web server 3 receives a request to view a webpage from the terminal 4, the web server 3 transmits a webpage information item to the terminal 4. Note that a webpage information item is generated on the basis of classification result information items generated by the microblog classification server 1 as described below.

The terminal 4 includes an operation unit such as a touch panel used to input an instruction for an operation, a display such as a liquid crystal display provided under the touch panel, and a controller having electronic components such as a CPU and a memory. The terminal 4 transmits an information item, which is to be referred to as a posted information item, such as a text item or an image, to the microblog server 2 in accordance with an operation performed by a user, thereby posting the information item on the microblog. Moreover, the terminal 4 transmits, to the microblog server 2, in accordance with an operation performed by the user, a request to view the microblog. When the terminal 4 receives the microblog information items from the microblog server 2 as a result of the request to view the microblog, the terminal 4 displays, on the display, text items or images (still images or moving images) included in posted information items of the microblog.

Furthermore, the terminal 4 transmits, in accordance with an operation performed by the user, to the web server 3, a request to view a webpage. As a result of the request to view a webpage, when the terminal 4 receives a webpage information item corresponding to the webpage from the web server 3, the terminal 4 performs a display process on the webpage information item, and displays the webpage on the display.

Note that the terminal 4 is, for example, a mobile phone. Alternatively, a personal digital assistant (PDA), a personal computer, or the like may be used as the terminal 4. Furthermore, although one terminal 4 is illustrated in FIG. 1, the number of terminals 4 may be two or more.

The network 5 is a communication network such as the Internet or a local area network (LAN), regardless of whether the network 5 is a wired network or wireless network.

Configuration of Microblog Classification Server

Figure 2:
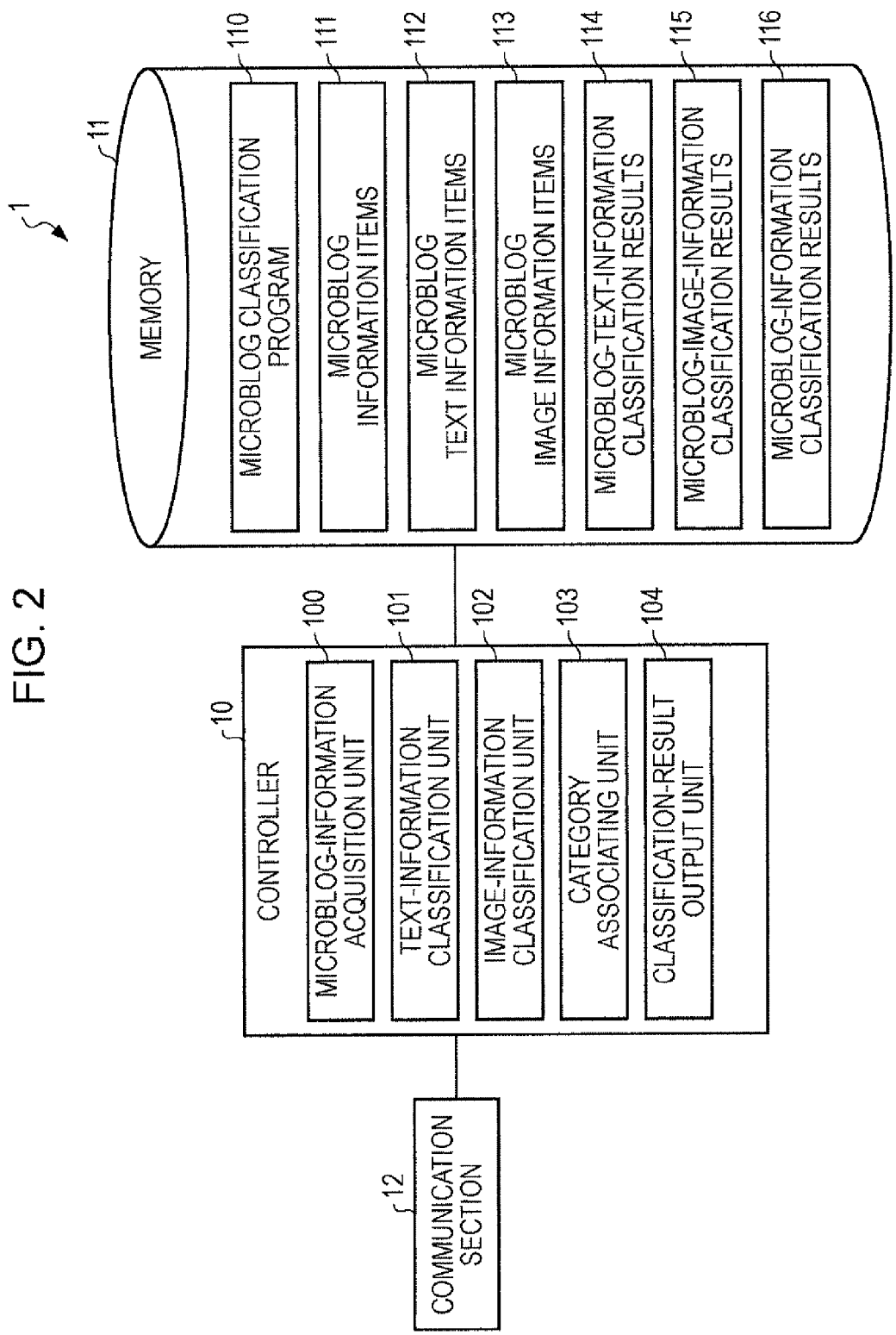
FIG. 2 is a block diagram illustrating an example of a configuration of a microblog classification server.

FIG. 2 is a block diagram illustrating an example of a configuration of the microblog classification server 1.

The microblog classification server 1 includes a controller 10, a memory 11, and a communication section 12. The controller 10 is constituted by a CPU or the like, and controls individual units and executes various types of programs. The memory 11 is provided as an example of a storage device that is constituted by a recording medium such as a hard disk drive (HDD) or a flash memory and that stores information items. The communication section 12 communicates with an external apparatus via the network 5.

The controller 10 executes a microblog classification program 110, which is described below, thereby functioning as a microblog-information acquisition unit 100, a text-information classification unit 101, an image-information classification unit 102, a category associating unit 103, a classification-result output unit 104, and so forth.

The microblog-information acquisition unit 100 acquires microblog information items 111 from the microblog server 2, and stores the microblog information items 111 in the memory 11. Note that all of the microblog information items accumulated in the microblog server 2 may be acquired as the microblog information items 111, or microblog information items that have been obtained by filtering using a predetermined time period, a predetermined keyword, or the like may be acquired as the microblog information items 111. A method for acquiring the microblog information items 111 will be described below.

The text-information classification unit 101 considers information items that have been obtained by removing image information items from individual posted information items included in the microblog information items 111 acquired by the microblog-information acquisition unit 100, i.e., only text information items, as microblog text information items 112. Further, the individual text information items included in the microblog text information items 112 are classified into categories to obtain results, and stores the results as microblog-text-information classification results 114 in the memory 11.

Note that, as an example of a classification method, the text-information classification unit 101 determines whether or not each of multiple words is present in text items that belong to the individual categories, and generates a feature vector having the presence/absence of the word as an element, thereby performing learning in advance. The text-information classification unit 101 generates a feature vector similarly for a text information item that is a classification target, and compares the generated feature vector with the feature vector obtained as a result of learning. Accordingly, the text information item that is a classification target is classified by determining whether the text information item belongs to any one of the categories.

The image-information classification unit 102 considers information items that have been obtained by removing text information items from individual posted information items included in the microblog information items 111 acquired by the microblog-information acquisition unit 100, i.e., only image information items, as microblog image information items 113. Further, the image-information classification unit 102 classifies individual images included in the microblog image information items 113 into categories to obtain results, and stores the results as the microblog-image-information classification results 115 in the memory 11.

Note that, as an example of a classification method, the image-information classification unit 102 generates feature information items of images related to the individual categories, thereby performing learning in advance. The image-information classification unit 102 similarly generates a feature information item of an image information item that is a classification target, and compares the generated feature information item with the feature information item obtained as a result of learning. Accordingly, the image information item that is a classification target is classified by determining whether the image information item belongs to any one of the categories.

The category associating unit 103 associates the microblog-text-information classification results 114 and the microblog-image-information classification results 115 with each other on the basis of the categories into which the microblog-text-information classification results 114 have been classified by the text-information classification unit 101 and the categories into which the microblog-image-information classification results 115 have been classified by the image-information classification unit 102, and stores the classification results as microblog-information classification results 116 in the memory 11.

The classification-result output unit 104 outputs the microblog-information classification results 116 to an external apparatus, e.g., the web server 3.

The memory 11 stores the microblog classification program 110, the microblog information items 111, the microblog text information items 112, the microblog image information items 113, the microblog-text-information classification results 114, the microblog-image-information classification results 115, the microblog-information classification results 116, and so forth.

The microblog classification program 110 is a program that causes the controller 10 to operate as the above-described individual units 100 to 104.

FIG. 3 is a schematic diagram illustrating an example of a configuration of the microblog information items 111.

The microblog information items 111 have a microblog ID column and a content column. In the microblog ID column, for example, identifiers that are added in chronological order are arranged. In the content column, content items that are text items input as posted information items, URLs of other servers in which images (still images or moving images) are stored and which are not illustrated, or the text items and the URLs are arranged. Note that, instated of the URLs arranged in the content column, information items concerning the still images or the moving images may be directly arranged in the content column.

Note that, although each of the content items is an information item posted by a user having a user ID and includes a time information item indicating a time at which the content item was posted, here, the user ID and the time information item are omitted and the content item is displayed.

Figure 4:
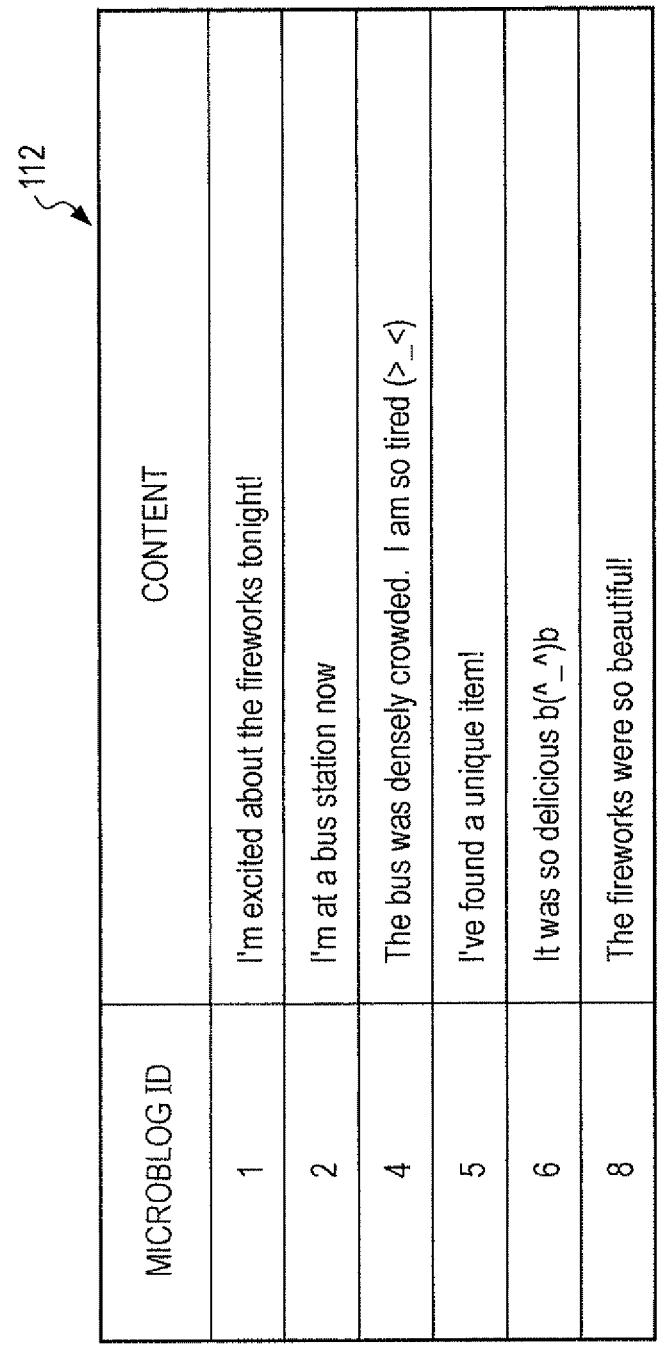
FIG. 4 is a schematic diagram illustrating an example of a configuration of microblog text information items.

FIG. 4 is a schematic diagram illustrating an example of a configuration of the microblog text information items 112.

The microblog text information items 112 have a microblog ID column and a text content column. The microblog ID column is the microblog ID column illustrated in FIG. 3, which is provided as a common column. In the text content column, content items that are text items which were input as posted information items are arranged.

In other words, the microblog text information items 112 are obtained by removing, from the microblog information items 111, posted information items including only URLs in which images are stored, and by removing, from posted information items including URLs, the URLs.

FIG. 5 is a schematic diagram illustrating an example of a configuration of the microblog image information items 113.

The microblog image information items 113 have a microblog ID column and an image content column. The microblog ID column is the microblog ID column illustrated in FIG. 3, which is provided as a common column. In the image content column, actual image information items stored in URLs which were input as posted information items are arranged.

In other words, the microblog image information items 113 are obtained by removing, from the microblog information items 111, posted information items including only text items, and by acquiring image information items from URLs in which images are stored.

FIG. 6 is a schematic diagram illustrating an example of a configuration of the microblog-text-information classification results 114.

The microblog-text-information classification results 114 have a microblog ID column, a text content column, and a category column. The microblog ID column is the microblog ID column illustrated in FIG. 3, which is provided as a common column. The text content column is the text content column illustrated in FIG. 4, which is provided as a common column. In the category column, category names that are obtained as results of classification of text items arranged in the text content column are arranged.

FIG. 7 is a schematic diagram illustrating an example of a configuration of the microblog-image-information classification results 115.

The microblog-image-information classification results 115 have a microblog ID column, an image content column, and a category column. The microblog ID column is the microblog ID column illustrated in FIG. 3, which is provided as a common column. The image content column is the image content column illustrated in FIG. 5, which is provided as a common column. In the category column, category names that are obtained as results of classification of image information items arranged in the image content column are arranged.

Figure 8:
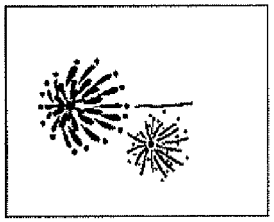
FIG. 8 is a schematic diagram illustrating an example of a configuration of microblog-information classification results.

FIG. 8 is a schematic diagram illustrating an example of a configuration of the microblog-information classification results 116.

The microblog-information classification results 116 have a microblog ID column, an image content column, a text content column, and a category column. The microblog ID column is the microblog ID column illustrated in FIG. 3, which is provided as a common column. The image content column is the image content column illustrated in FIG. 5, which is provided as a common column. The text content column is the text content column illustrated in FIG. 4, which is provided as a common column. The category column is the category column illustrated in FIGS. 6 and 7, which is provided as a common column.

Operation of Microblog Classification System

Next operations in the present exemplary embodiment are separately described as the following operations: (1) basic operation; (2) microblog-information acquiring operation; (3) microblog classification operation; and (4) classification-result output operation.

(1) Basic Operation

First, the user of the terminal 4 performs, on the terminal 4, an operation for transmitting an information item, which is to be referred to as a posted information item, to the microblog.

The terminal 4 transmits, to the microblog server 2, in accordance with the operation performed by the user, an information item which includes a text item, an image, or the like and which is to be referred to as a posted information item, thereby posting the information item on the microblog.

The microblog server 2 receives the posted information item from the terminal 4, thereby accumulating the microblog information items.

Furthermore, the user of the terminal 4 performs, on the terminal 4, an operation for viewing the microblog.

The terminal 4 transmits, to the microblog server 2, in accordance with the operation performed by the user, a request to view the microblog information items.

The microblog server 2 transmits the microblog information items to the terminal 4.

When the terminal 4 receives the microblog information items from the microblog server 2, the terminal 4 displays, on the display, text items or images posted on the microblog.

Meanwhile, the administrator of the web server 3 makes a request to the microblog classification server 1 for information items that are to be used as materials for generating a webpage which is to be placed on the web server 3. Note that the web server 3 may regularly make the request to the microblog classification server 1.

The microblog classification server 1 operates as follows in response to the request.

Figure 9:
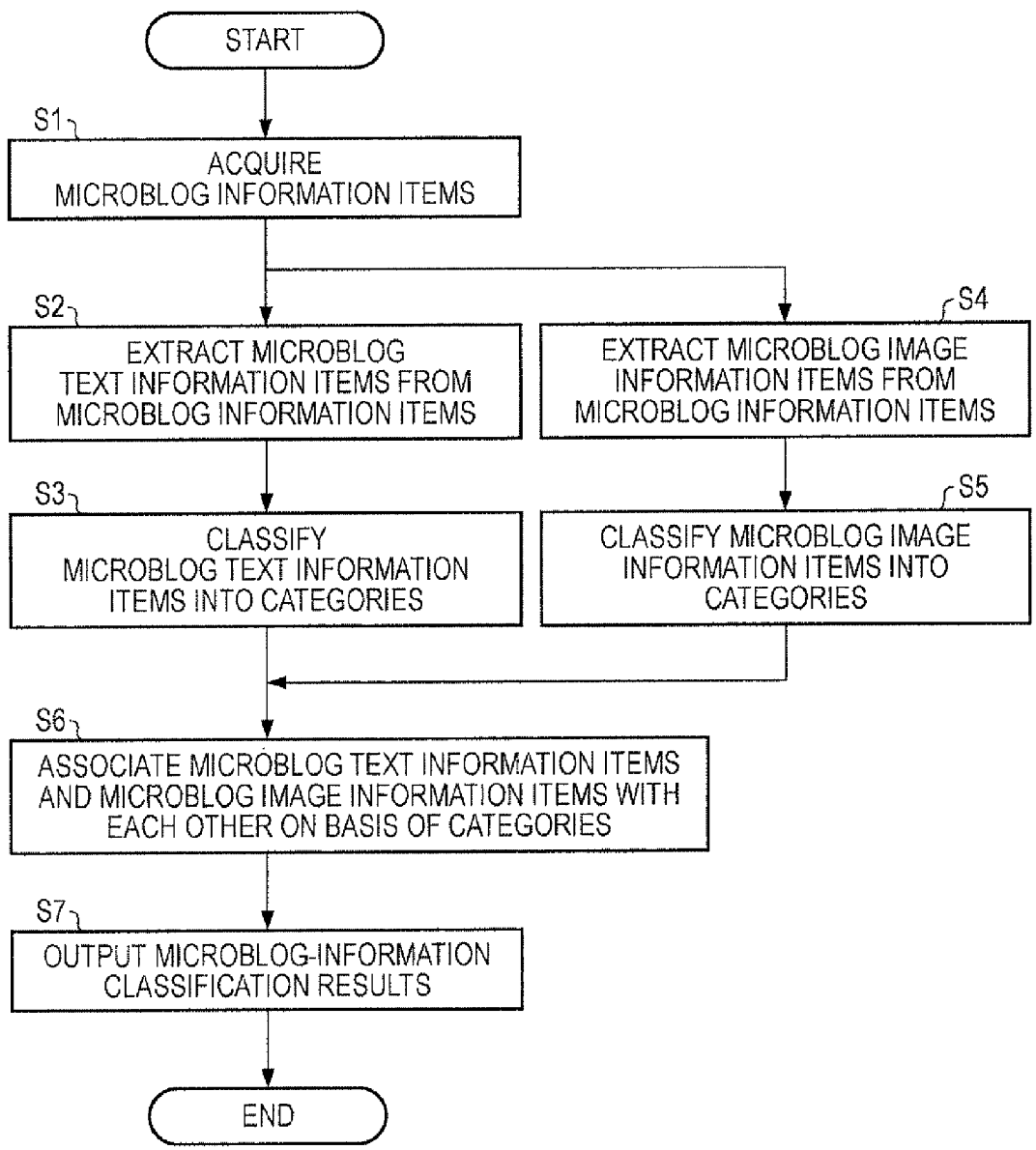
FIG. 9 is a flowchart illustrating an example of an operation of the microblog classification system.

FIG. 9 is a flowchart illustrating an example of an operation of the microblog classification system.

(2) Microblog-Information Acquiring Operation

First, the microblog-information acquisition unit 100 acquires, from the microblog server 2, the microblog information items 111 that are targets (S1).

The microblog-information acquisition unit 100 may acquire all of the microblog information items stored in the microblog server 2 as the microblog information items 111. However, the microblog-information acquisition unit 100 may acquire some of the microblog information items, whereby the processing load for processes that are described below may be reduced. A method for acquiring some of the microblog information items is, for example, as follows.

First, the microblog-information acquisition unit 100 specifies multiple keywords related to the content of the webpage that is to be placed on the web server 3.

Next, the microblog-information acquisition unit 100 retrieves a posted information item including one keyword selected from among the multiple keywords.

Next, the microblog-information acquisition unit 100 identifies a user who posted the information item that is the posted information item which has been retrieved, and retrieves a posted information item including another one of the specified keywords from posted information items that were posted in a predetermined time period among posted information items of the identified user. Next, a series of posted information items starting with the posted information item including the selected one keyword and ending with the posted information item including the other keyword is acquired.

By acquiring some of the microblog information items stored in the microblog server 2 as described above, a series of posted information items transmitted by a certain user for a certain keyword may be acquired.

(3) Microblog Classification Operation

Next, the text-information classification unit 101 considers information items that have been obtained by removing image information items from posted information items included in the microblog information items 111 illustrated in FIG. 3, i.e., only text information items, as the microblog text information items 112 illustrated in FIG. 4 (S2). In the example illustrated in FIG. 3, URLs that are destinations in which image information items are stored are removed.

Furthermore, the text-information classification unit 101 classifies the individual text information items included in the microblog text information items 112 illustrated in FIG. 4 into the categories to obtain results, and stores the results as the microblog-text-information classification results 114 in the memory 11 as illustrated in FIG. 6 (S3).

Meanwhile, the image-information classification unit 102 considers information items that have been obtained by removing text information items from the microblog information items 111 which have been acquired by the microblog-information acquisition unit 100 and which are illustrated in FIG. 3, i.e., only image information items, as the microblog image information items 113 illustrated in FIG. 5 (S4). In the example illustrated in FIG. 4, text information items are removed, and image information items are acquired from URLs in which the image information items are stored.

Moreover, the image-information classification unit 102 classifies individual images included in the microblog image information items 113 illustrated in FIG. 4 into the categories to obtain results, and stores the results as the microblog-image-information classification results 115 in the memory 11 as illustrated in FIG. 7.

Next, the category associating unit 103 stores the microblog-text-information classification results 114, which are illustrated in FIG. 6, and the microblog-image-information classification results 115, which are illustrated in FIG. 7, as the microblog-information classification results 116, which are illustrated in FIG. 8, in the memory 11 so that the microblog-text-information classification results 114 and the microblog-image-information classification results 115 are associated with each other on the basis of categories arranged in the category column.

(4) Classification-Result Output Operation

Next, the classification-result output unit 104 outputs the microblog-information classification results 116 to the web server 3 (S7).

The web server 3 generates the webpage on the basis of the microblog-information classification results 116.

Note that "(2) microblog-information acquiring operation" and "(3) microblog classification operation" may be performed at predetermined time intervals or every time the microblog information items stored in the microblog server 2 are updated. In such a case, the microblog-information classification results 116 are successively transmitted from the microblog classification server 1 to the web server 3. Furthermore, it is supposed that the web server 3 updates the contents of the webpage every time the microblog-information classification results 116 are received.

Meanwhile, the terminal 4 transmits, to the web server 3, a request to view the webpage. In response to the request to view the webpage, the web server 3 transmits a webpage information item corresponding to the webpage to the terminal 4.

When the terminal 4 receives the webpage information item from the web server 3, the terminal 4 performs a display process on the webpage information item, and displays the webpage on the display.

Figure 10:
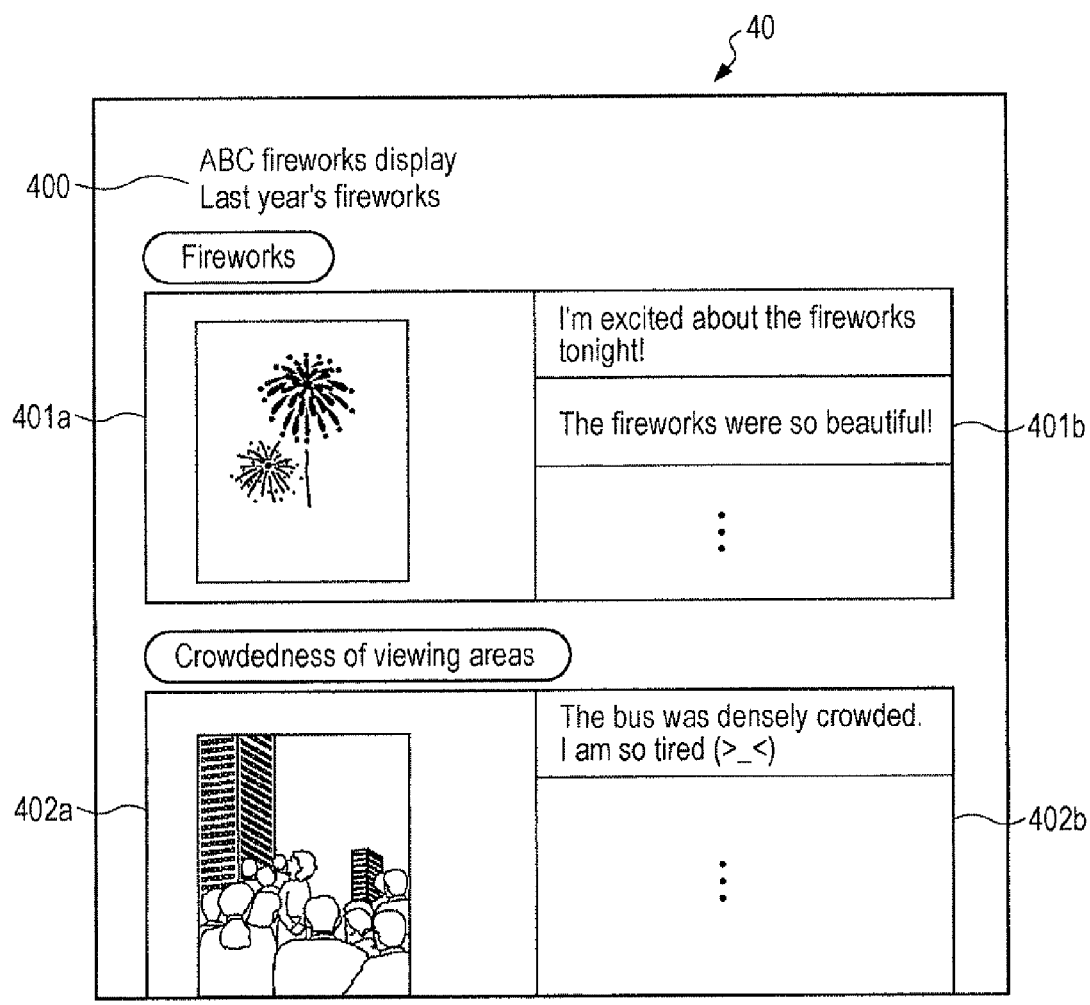
FIG. 10 is a schematic diagram illustrating an example of a display screen that is obtained by performing a display process on a webpage information item generated on the basis of the microblog-information classification results.

FIG. 10 is a schematic diagram illustrating an example of a display screen that is obtained by performing a display process on the webpage information item generated on the basis of the microblog-information classification results 116.

A webpage display screen 40 is, for example, a display screen showing a fireworks display that was held in the past. The webpage display screen 40 includes a title 400, image display regions 401a and 402a . . . , and text display regions 401b and 402b . . . . In the image display regions 401a and 402a . . . , image information items are displayed for each of the categories into which the image information item have been classified by the image-information classification unit 102. In the text display regions 401b and 402b . . . , text information items are displayed for each of the categories into which the text information item have been classified by the text-information classification unit 101.

Note that, although the web server 3 updates the contents of the webpage information item every time the web server 3 receives the microblog-information classification results 116, the image display regions 401a and 402a . . . and the text display regions 401b and 402b . . . may be updated independently of each other. The reason for this is that, in a microblog that is typically operated at present, in most cases, the number of image information items is smaller than the number of text information items. In other words, the reason is as follows. The number of image information items (for example, the number of still images) for each of the categories into which the image information items have been classified and the number of the text information items (the number of posted information items input as text items) for each of the categories into which the text information items have been classified are different from each other. If the image display regions 401*a* and 402*a* . . . and the text display regions 401*b* and 402*b* . . . are simultaneously updated, the area of the text display regions 401*b* and 402*b* . . . that are necessary to display text information items becomes larger than that of the image display regions 401*a* and 402*a* . . . that are necessary to display image information items. Consequently, the balance therebetween is lost.

Accordingly, time intervals at which display of image information items is updated and time intervals at which display of text information items is updated may be different from each other. In this case, the time intervals at which display of image information items is updated are set to be longer than the time intervals at which display of text information items is updated, whereby the above-described issue may be addressed. Moreover, the time intervals at which display of image information items is updated may be set to be shorter than the time intervals at which display of text information items is updated.

For example, it is supposed that 100 images are classified as image information items related to a category of "fireworks", and 1000 text information items are classified as text information items related to the category of "fireworks". In this case, the time intervals at which display of image information items is updated are set to be longer than the time intervals at which display of text information items is updated (for example, display of image information items is updated at time intervals which are 10 times the time intervals at which display of text information items is updated), whereby, in the case where the text display regions 401*b* and 402*b* . . . and the text display regions 401*b* and 402*b* . . . are displayed, the balance therebetween may be maintained.

Additionally, the types of webpages placed on the web server 3 are not particularly limited. In addition to a report of an event held in the past as illustrated in FIG. 10, examples of the types of webpages placed on the web server 3 include a complaint report that is viewed by members of the executive committee of an event and a summary website related to a certain keyword.

In the foregoing first exemplary embodiment, the microblog information items 111 are divided into the microblog text information items 112 and the microblog image information items 113. Classification of the microblog text information items 112 into categories and classification of the microblog image information items 113 into categories are performed independently of each other. The microblog text information items 112 and the microblog image information items 113 are associated with each other for each of the categories. Accordingly, posted information items in which multiple text information items and image information items are mixed and which are displayed in chronological order may be classified.

Furthermore, in the case where a text item and a URL of an image are included in one posted information item, if the posted information item including the text item and the URL of an image is displayed as a classification result, a category into which the text item has been classified and a category into which the image has been classified do not necessarily match. However, the accuracy at which the content of a text information item and the content of an image information item match may be improved, compared with that in the case where the posted information item including the text item and the URL of an image is displayed as a classification result.

Second Exemplary Embodiment

Figure 11:
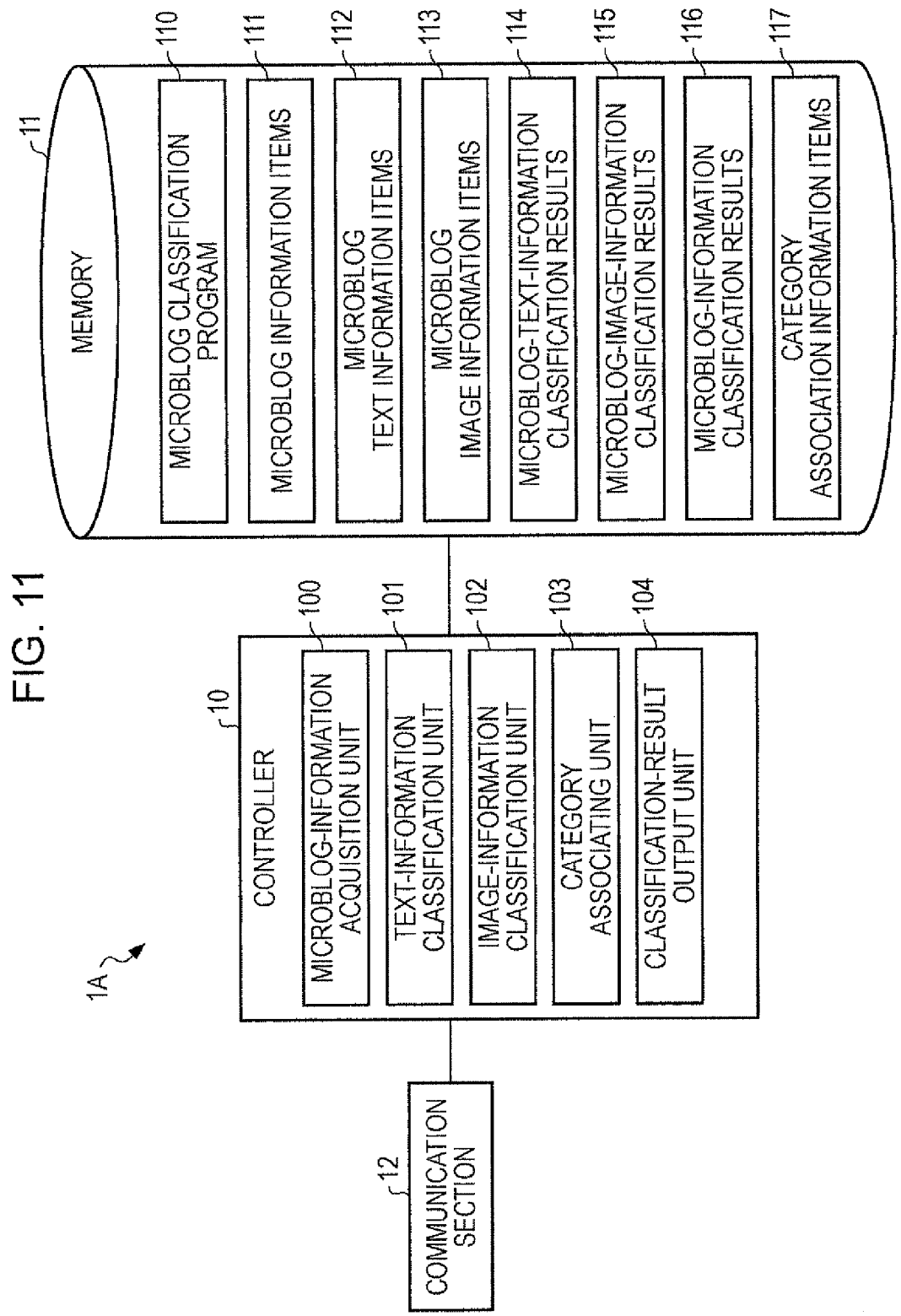
FIG. 11 is a block diagram illustrating an example of a configuration of a microblog classification server according to a second exemplary embodiment.

FIG. 11 is a block diagram illustrating an example of a configuration of a microblog classification server according to a second exemplary embodiment. The same components in the first exemplary embodiment are denoted by the same reference numerals.

A microblog classification server 1A according to the second exemplary embodiment is obtained by adding category association information items 117 to the configuration of the microblog classification server 1 according the first exemplary embodiment. Furthermore, the operation of the category associating unit 103 in the second exemplary embodiment is different from that of the category associating unit 103 in the first exemplary embodiment.

FIG. 12 is a schematic diagram illustrating an example of a configuration of the category association information items 117.

The category association information items 117 include an overall category column, a text information category column, and an image information category column. In the overall category column, categories used to associate the categories for text information items and the categories for image information items with each other are arranged. In the text information category column, the categories into which the microblog text information items 112 are classified are arranged. In the image information category column, the categories into which the microblog image information items 113 are classified are arranged.

Operations in Second Exemplary Embodiment

Operations in the second exemplary embodiment are similar to the operations in the first exemplary embodiment except an operation described below. Accordingly, a description thereof is omitted.

The category associating unit 103 associates the microblog-text-information classification results 114, which are illustrated in FIG. 6 and the microblog-image-information classification results 115, which are illustrated in FIG. 7, with each other on the basis of the categories arranged in the category columns and the category association information items 117, and stores the classification results as the microblog-information classification results 116 in the memory 11.

For example, image information items are classified using image analysis. Accordingly, image information items are not classified into subjective categories such as a category of "obstacles" and a category of "disappointed", and classified into objective categories such as a category of "wait in line". In the first exemplary embodiment, image information items are not directly associated with text information items classified into categories such as the category of "obstacles" and the category of "disappointed". However, in the second exemplary embodiment, in the case where a category of "negative" is set as an overall category, image information items classified into the category of "wait in line" and text information items classified into categories such as the category of "obstacles" and the category of "disappointed" may be associated with each other as information items classified into the same category.

In the foregoing second exemplary embodiment, a configuration is used, in which, in the case where the category associating unit 103 associates text information items and image information items, the text information items and the image information items are associated with each other on the basis of the category association information items 117 instead of perfect matching of categories. Thus, information items posted on the microblog may be classified into categories that are conceptually broader than those in the first exemplary embodiment.

Note that the category associating unit 103 may associate, using parameters other than categories, image information items and text information items with each other. For example, in the case where text information items and image information items include time information items, a condition where the time information item included in an image information item and the time information item included in a text information item are within a certain time period may be used as a condition under which the image information item and the text information item are associated with each other. Moreover, in the case where text information items and image information items include user information items, a condition where the user information item included in an image information item and the user information item included in a text information item match may be used as a condition under which the image information item and the text information item are associated with each other. Additionally, in the case where text information items and image information items include location information items such as global positioning system (GPS) information items, a condition where the location information item included in an image information item and the location information item included in a text information item match may be used as a condition under which the image information item and the text information item are associated with each other.

Furthermore, the text-information classification unit 101 and the image-information classification unit 102 may change the degrees of association with the categories into a numeric form using scores. The category associating unit 103 may associate the microblog-text-information classification results 114 and the microblog-image-information classification results 115 with each other on the basis of the scores.

Other Exemplary Embodiments

Note that the present invention is not limited to the foregoing exemplary embodiment, and various modifications may be made without departing from the scope of the present invention. For example, the microblog is not limited to Twitter (registered trademark), and any type of medium may be used if the medium is a medium on which comparatively short text items are posted, in which text information items and image information items (including still images, moving images, and link destination information items concerning links to information items concerning the still images or moving images) are mixed, and in which a large number of text information items and image information items are displayed in chronological order, such as Facebook (registered trademark). Furthermore, for example, messages of mail may be targets to be processed as posted information items.

In the foregoing exemplary embodiment, the functions of the individual units 100 to 104 included in the controller 10 are realized by a program. However, all or some of the individual units may be realized by hardware such as an application-specific integrated circuit (ASIC). Furthermore, the program used in the foregoing exemplary embodiment may be stored on a recording medium, such as a compact disc read-only memory (CD-ROM), and supplied. Moreover, the steps described in the foregoing exemplary embodiment may be, for example, replaced, removed, or added without changing the scope of the present invention.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A non-transitory computer-readable medium storing a program causing a computer to execute a process, the process comprising:
    acquiring from a microblog server a plurality of posted information items, each of the plurality of posted information items including at least either of a text information item and an image information item;
    generating text information items including a plurality of text items where the image information items are removed from the plurality of posted information items, and individually classifying the text items included in the text information items into first categories;
    generating image information items including a plurality of images where the text information items are removed from the plurality of posted information items, and individually classifying the images included in the image information items into second categories;
    associating the classified text items and the classified images with each other on the basis of the first and second categories to obtain results; and
    outputting the text items and the images, which have been associated with each other, for each of the results.

2. The medium according to claim 1, wherein, in the outputting, the text items and the images are output independently of each other for each of the results.

3. The medium according to claim 1, wherein, in the associating, association information items in which the first categories and the second categories are associated with each other using overall categories are provided, and the classified text items and the classified images are associated with each other on the basis of the first categories, the second categories, and the overall categories included in the association information items.

4. The medium according to claim 2, wherein, in the associating, association information items in which the first categories and the second categories are associated with each other using overall categories are provided, and the classified text items and the classified images are associated with each other on the basis of the first categories, the second categories, and the overall categories included in the association information items.

5. An information classification computer-implemented method comprising:
    acquiring from a microblog server a plurality of posted information items, each of the plurality of posted information items including at least either of a text information item and an image information item;
    generating text information items including a plurality of text items where the image information items are removed from the plurality of posted information items, and individually classifying the text items included in the text information items into first categories;
    generating image information items including a plurality of images where the text information items are removed from the plurality of posted information items, and individually classifying the images included in the image information items into second categories;

associating the classified text items and the classified images with each other on the basis of the first and second categories to obtain results; and outputting the text items and the images, which have been associated with each other, for each of the results.

6. An information processing apparatus comprising:

a processor configured to act as:

an acquisition unit that acquires a plurality of posted information items from a microblog server, each of the plurality of posted information items including at least either of a text information item and an image information item;

a text classification unit that generates text information items including a plurality of text items where the image information items are removed from the plurality of posted information items, and that individually classifies the text items included in the text information items into first categories;

an image classification unit that generates image information items including a plurality of images where the text information items are removed from the plurality of posted information items, and that individually classifies the images included in the image information items into second categories;

an associating unit that associates the classified text items and the classified images with each other on the basis of the first and second categories to obtain results; and an output unit that outputs the text items and the images, which have been associated with each other by the associating unit, for each of the results.

* * * * *